United States Patent
Holland et al.

[15] 3,683,036
[45] Aug. 8, 1972

[54] METHOD FOR PREPARING PERFLUOROCYCLOOLEFINS

[72] Inventors: Dewey G. Holland; Eric Vernon Garis, both of Allentown, Pa.

[73] Assignee: Air Products and Chemicals, Inc., Allentown, Pa.

[22] Filed: Oct. 7, 1969

[21] Appl. No.: 864,514

[52] U.S. Cl. ............................................260/648 F
[51] Int. Cl. .....C07c 17/00, C07c 23/08, C07c 23/10
[58] Field of Search ...................................260/648 F

[56] References Cited

UNITED STATES PATENTS 2,746,997   5/1956   Reid et al. ...............260/648 F

FOREIGN PATENTS OR APPLICATIONS 1,557,170   1/1969   France ....................260/648 F Primary Examiner—Daniel D. Horwitz
Attorney—David T. Nikaido and B. Max Klevit

[57] ABSTRACT

Five and six membered ring perfluorinated cyclic acid and acid fluorides are reacted with organic acids, salts of organic acids, alkanol sulfate salts, aqueous basic solutions or molecular sieves to obtain five and six membered ring fluoroalkyl substituted and unsubstituted perfluoroolefins having six to 10 carbon atoms.

5 Claims, No Drawings

METHOD FOR PREPARING PERFLUOROCYCLOOLEFINS

BACKGROUND OF THE INVENTION

The present invention relates to the preparation of cyclic olefins and more particularly, to the preparation of five and six membered ring fluoroalkyl substituted and unsubstituted perfluoroolefins having six to 10 carbon atoms, including the novel perfluoroolefin compounds decafluoro-3-methyl cyclopentene, decafluoro-4-methyl cyclopentene and octadecafluoro-4-(n-butyl) cyclohexene.

Unsaturated cyclic fluorocarbons have value as chemical intermediates which will undergo addition and substitution reactions. Fluorinated aliphatic dicarboxylic acids can be obtained by subjecting cyclic fluoroolefins to oxidation whereby the carbon ring is converted to an open chain. For example, perfluorocyclohexene upon treatment with basic aqueous permanganate solution gives perfluoroadipic acid. Unsaturated ethers can be obtained by reacting cyclic fluoroolefins with an alcohol, such as methanol, ethanol and isopropyl alcohol, in the presence of a base. Cyclic fluoroolefin epoxides can be obtained by the epoxidation of the corresponding cyclic fluoroolefin using aqueous alkaline hydrogen peroxide. Fluorocarbon polyethers can be obtained by the polymerization of the cyclic fluorocarbon epoxides. The cyclic fluoroolefin epoxides can also be converted to carbonyl compounds by the action of cesium fluoride. It is further known that free radical addition of alcohol, such as methanol, to cyclic fluoroolefins can be obtained. In addition, the perfluorinated diacids resulting from oxidation of cyclic fluoroolefins can be converted to triazine elastomers. Such elastomers have high heat stability and resistance to chemical attack and in general, find utility as fuel tank sealants, wire insulation, in the fabrication of gaskets, etc.

It is known that decafluorocyclohexene and dodecafluoromethylcyclohexene can be prepared by the pyrolysis (at 550° C.) of perfluorocyclohexyl and perfluoro methylcyclohexyl carboxylic acids. The resulting liquid fluorocarbon product is then recovered by fractional distillation. However, this method produces very low yields. Another procedure involves the decomposition of perfluorocyclohexane carboxylic acid in water to obtain decafluorocyclohexene. Again, this method also results in very low yields, e.g., 20 to 30 percent. Therefore, it would be highly desirable to provide a method for producing high yields of perfluoro cyclic olefin compounds.

SUMMARY OF THE INVENTION

An object of the present invention is to provide a method for obtaining cyclic perfluoroolefins.

Another object of the present invention is to provide a method for preparing five and six membered ring fluoroalkyl substituted and unsubstituted perfluoroolefins in very high yields.

Still another object of the present invention is to provide novel cyclic perfluoroolefin compounds.

In accordance with the present invention it has been discovered that cyclic perfluoroolefins having six to 10 carbon atoms can be obtained in high yields by heating a five or six membered ring perfluorinated cyclic acid or acid fluoride at a temperature between 40° and 200° C. with a reagent which is either an organic acid, a salt of an organic acid, alkanol sulfate salts, an aqueous basic solution or a molecular sieve.

Effluent material is passed into a dry ice cooled condenser. Unconverted five or six membered ring perfluorinated cyclic acid or acid fluoride can be removed from the cyclic perfluoroolefin product by a 25 percent potassium hydroxide wash solution at room temperature. Further purification of the effluent can be obtained by fractional distillation.

Included in the cyclic perfluoroolefins which can be prepared by the process of this invention are the novel perfluoroolefin compounds decafluoro-3-methylcyclopentene, decafluoro-4-methylcyclopentene and octadecafluoro-4-(n-butyl) cyclohexene.

DESCRIPTION OF THE PREFERRED EMBODIMENTS

The five or six membered ring perfluorinated acid and acid fluorides employed as starting materials in the present invention can be prepared from the corresponding hydrocarbon acids by electrolysis of a solution thereof in anhydrous liquid hydrogen fluoride, using an iron-cathode nickel-anode cell operated at about +16° C., the applied cell voltage being about 5 to 7.7 volts. The starting acid is converted to the corresponding fully fluorinated acid fluoride ($R_fCOF$, where $R_f$ is the perfluorocarbon radical), which settles to the bottom of the cell together with fluorocarbon byproducts. The fluorinated product can be mixed with the theoretical amount of water required for hydrolysis of the perfluoro cyclic acid fluoride to the perfluoro cyclic acid, which is then recovered by fractional distillation.

This electrochemical fluorination procedure causes fluorine addition to unsaturated ring starting compounds. Hence, aromatic carboxylic acids can be employed as starting compounds for preparing the perfluoro saturated cycloalkyl carboxylic acids employed in the present invention. Thus, benzoic acid, $C_6H_5COOCH$, can be fluorinated to produce c-$C_6F_{11}COF$, (wherein c- indicates cyclic structure), which can be hydrolyzed to the perfluorocyclohexane carboxylic acid, c-$C_6F_{11}COOH$. Similarly, ortho-toluic acid, $CH_3C_6H_4COOH$, can be used for making perfluoro-2-methylcyclohexane carboxylic acid, 2-$CF_3C_6F_{10}COOH$; meta-toluic acid can be used for making perfluoro-3-methylcyclohexane carboxylic acid, 3-$CF_3C_6F_{10}COOH$; para-toluic acid can be used for making perfluoro-4-methylcyclohexane carboxylic acid, 4-$CF_4C_6F_{10}COOH$; and p-(n-butyl) benzoic acid, 4-$CH_3CH_2CH_2CH_2C_6H_4CO_2H$, can be used for making perfluoro-4-(n-butyl) cyclohexane carboxylic acid. The corresponding acid halides of the above acids may also be employed as starting compounds. The procedure for preparing perfluorinated cyclic acids and acid fluorides is broadly described in the patent of J. H. Simons, U. S. Pat. No. 2,519,983, which disclosure is hereby incorporated by reference.

The reagents which are reacted with the five and six membered ring perfluorinated cyclic acid and acid fluorides at a temperature between 40° and 200° C. to obtain the desired five and six membered ring fluoroalkyl substituted and unsubstituted perfluoroolefins include such reagents as organic acids, salts of organic acids, alkanol sulfate salts, aqueous basic solutions and molecular sieves. Examples of such reagents include stearic acid, isodecanoic acid, valeric acid, potassium laurate, sodium lauryl alcohol sulfate, sodium neopentyl alcohol sulfate, sodium carbonate, an aqueous solution of potassium hydroxide, an aqueous solution of sodium bicarbonate, an aqueous solution of sodium carbonate, an aqueous solution of potassium bicarbonate, anhydrous sodium acetate and 3A molecular sieve.

The invention will be illustrated by the following specific examples, it being understood that there is no intention to be necessarily limited by any details thereof since variations can be made within the scope of the invention. Examples I through III describe the preparation of the materials used by Examples IV through XVII in accordance with the present invention.

EXAMPLE I

The electrofluorination of benzoyl chloride was conducted in an electrolytic cell of the type described in U.S. Pat. No. 2,519,983. The outer body and lid of the cell were constructed of Monel metal. The electrode pack was composed of a series of alternately spaced nickel anode and cathode plates. The plate spacing was approximately one-eighth inch and the annulus between the electrode pack and the inner wall of the cylindrical cell was approximately one inch. The cell plates were one-sixteenth inch thick and were insulated from each other with polytetrafluoroethylene spacers. A condenser, through which the exit gases were passed, was cooled with a liquid carbon dioxide cold finger and maintained at about −30° to −40° C. The outer jacket of the cell was generally maintained between −7° to +16° C. by circulating a cooling liquid therethrough.

The cell, having a volume of 4,500 cc with a total anode area of 4.245 square feet, was charged with anhydrous hydrogen fluoride. Five volts of direct current were applied and the voltage was increased over a period of time until the current drawn was below five amperes at an applied seven volts — indicating that the hydrogen fluoride was dry. 3.2 moles of benzoyl chloride were then introduced into the top of the cell and a voltage of about 6.8 volts of direct current was applied. The electrolyte temperature was generally maintained between 2° and 18° C. throughout the process by operation of the jacket coolant system.

As set forth in the following table, charge addition and product collection were performed on a 24-hour basis:

| Cumulative Charge Added to Cell (moles/24 hr.) | Cumulative Faradays/24 hr. | Cumulative Liquid Product (grams/24 hr.) |
|---|---|---|
| 3.214 | 0.00 | 0 |
| 3.214 | 6.15 | 0 |
| 3.214 | 28.32 | 0 |
| 4.214 | 46.23 | 204 |
| 6.214 | 71.34 | 556 |
| 7.214 | 92.64 | 777 |
| 10.214 | 124.51 | 1,184 |
| 12.214 | 149.58 | 1,523 |
| 13.214 | 168.69 | 1,810 |
| 14.214 | 195.63 | 2,158 |
| 16.214 | 222.01 | 2,603 |

The cell product was drained from the bottom of the cell and benzoyl chloride was added through a stoppered opening in the top of the cell. Each fresh charge was added to the cell based on the consumption of electrical power. Approximately a two-mole excess of fresh charge was maintained over and above the number of Faradays passed through the cell divided by the number of Faradays required for theoretical operation of the process.

The cell product was analyzed by the following esterification technique. Fifty-seven grams of absolute ethanol were added to a dry 250 ml. three neck round bottom flask equipped with magnetic stirrer, thermometer, dropping funnel, ice-acetone bath, and condenser. The temperature was held at 0°–10° C. while 100 grams of cell draining were added at a moderately fast rate (5 minutes) and while the reaction mixture was stirred. After addition was complete, the ice bath was removed and the reaction mixture stirred for 1 hour as the temperature rose to 20°–25° C. The reaction mixture was then cooled to 15° C. and 100 ml. of cold water were added. The reaction mixture was stirred for 15 minutes and allowed to stand for 15 minutes before gas chromatographic (GC) analysis of the lower phase.

A comparison of the chromatograms of the esterified and non-esterified cell products was made. Those materials whose retention times were lengthened by esterification are considered esters. Those materials maintaining the same retention times, after esterification, are considered "inerts."

The GC analysis consisted of a 4–7 $\mu$l injection into a 15 foot × one-fourth inch 20 percent DC-11/chromasorb W column. The chromatograph chart paper peaks were cut out, and weighted. The results were obtained in mole percent. Weight percent is a good approximation in this case.

In this way, the cell product was found to be composed of 20.3 percent nonfunctional, inert fluorochemicals, such as dodecafluoromethyl cyclopentane, dodecafluorocyclohexane and tetradecafluoromethylcyclohexane; fluoro-chemical acid fluorides capable of forming esters with ethanol, namely, undecafluoro-2-methylcyclopentane carbonyl fluoride and undecafluoro-3-methylcyclopentane carbonyl fluoride and undecafluorocyclohexane carbonyl fluoride (67.9 percent of five-and six-membered ring acid fluorides in the approximate ratio of 3:7, respectively); and unidentified fluorinated acid fluorides (11.8 percent).

EXAMPLE II

The electrofluorination of benzoic acid was conducted in a 6,500 cc volume cell otherwise identical to the apparatus described in Example I. The run was begun with an initial charge of 5.327 moles of benzoic acid. The voltage was controlled between 6.2 to 7.0 volts. As set forth in the following table, charge addition and product collection were performed on a 24-hour basis.

| Cumulative Charge Added to Cell (moles/24 hr.) | Cumulative Faradays/24 hr. | Cumulative Liquid Product (grams/24 hr.) |
|---|---|---|
| 5.327 | 0.00 | 0 |
| 6.327 | 36.30 | 0 |

| | | |
|---|---|---|
| 8.327 | 72.53 | 171 |
| 10.327 | 108.88 | 363 |
| 12.327 | 160.89 | 934 |
| 14.327 | 202.65 | 1,357 |
| 16.327 | 242.99 | 1,914 |
| 18.327 | 304.66 | 2,820 |

The cell product was analyzed by the esterification technique described in Example I. In this way, the benzoic acid electrofluorination product was found to be composed of 36.2 percent nonfunctional, inert fluorochemicals, such as described in Example I; 56.0 percent of a mixture of $C_6F_{11}COF$ five and six-membered ring isomers; and unidentified fluorinated acid fluorides (7.8 percent).

EXAMPLE III 5,087 grams of the benzoyl chloride electrofluorination product described in Example I were added to a one-gallon polypropylene wide mouth bottle equipped with a Teflon coated stirrer. Dry ice was placed around the walls of the bottle and the electrofluorination product was stirred until the temperature reached 10° C. Water was then added with stirring in 50 ml. portions over a 15 minute period until 250 ml. was added. The reaction mixture had a maximum temperature of 68° C. 5 minutes later. This temperature dropper slowly to 10° C. after 1½ hours of total reaction time. The reaction mixture was then purged with nitrogen and heated to 23° C. over a period of one-half hour. At this point, 200 grams of 3A molecular sieve were added with stirring and $N_2$ purge. After 10 minutes the temperature was 30° C.

The reaction mixture was then filtered by suction over a period of two hours. After filtration, the product weighted 4,330 grams. The molecular sieve was then washed with 150 ml. of diethyl ether and the ether solution was added to the product.

Flash vaporization of the low boilers (fluorochemical inerts, ether, etc.) was then accomplished using a three liter, three neck, round bottom flask, simple Claisen head, condenser; $N_2$ purge into the flask; and a water aspirator vacuum. The low boilers were distilled at 30°–90° C. pot temperature and 100–50 mm pressure. The results of this distillation are as follows:

| Cut 0 | Pot Temp. (°C.) | Head Temp. (°C.) | Pressure (mm) | Wt. of Product (grams) |
|---|---|---|---|---|
| 1 | 82–92 | 32–81 | 28–25 | 153 |
| 2 | 95–96 | 81–91 | 22–24 | 800 |
| 3 | 96–105 | 90–96 | 22–20 | 1,500 |
| 4 | 115–130 decomp | 105–110 | 25–28 | 714 |
| 5 | 108–138 decomp | 89–108 | 1–2 | 181 |
| | | | Total Dist. | 3,398 |
| Residue | | | | 645 |
| | | | Total | 4,043 |

EXAMPLE IV 500 grams of the benzoyl chloride electrofluorination product described in Example I were added to a 2,000 ml. flask containing 500 grams of isodecanoic acid. The reaction mixture was stirred and heated with an oil bath. At a reactor temperature of 105°–135° C. and a head temperature of 59°–65° C., a 22.1 gram fraction was collected in a dry ice trap. At a reactor temperature of 135°–220° C. and a head temperature of 59°–110° C., a 334.7 gram fraction was collected in a dry ice trap. The 356.8 grams of product were analyzed by GC on a 20 foot, 0.25 inch, 30 percent SE-30 on Chromosorb W, AW, DMCS column programmed from room temperature to 200° C. The product composition was 16.7 percent of nonfunctional inert fluorochemicals as described in Example 1, 18.4 percent of decafluoro-3-methylcyclopentene, 46.3 percent decafluorocyclohexene, 18.4 percent decafluoro-4-methylcyclopentene, and 7.1 percent unidentified fluoroolefins.

Pure samples of the three major perfluorocyclic olefin products were obtained by preparative scale gas chromatography. Fluorine-19 nuclear magnetic resonance (nmr) spectra of the compounds were run on a Varian DP-60 Spectrometer at 56.4 Mc. frequency. Chemical shifts were measured in ppm from a trifluoroacetic acid external standard; decafluoro-3-methyl-cyclopentene IR olefin absorption 1,760 cm$^{-1}$, b.p. 46°–48° C., F-19 nmr chemical shifts at −0.4, (38,44), (49, 50), 68, 72, 101 ppm, in the relative area ratio of 3:2:2:1:1:1, respectively; decafluoro-4-methylcyclo-pentene IR olefin absorption 1,775 cm$^{-1}$, b.p. 48°–49° C., F-19 nmr chemical shifts at 2.5, 36, 74, 107 ppm, in the relative area ratio of 3:4:2:1, respectively; decafluorocyclohexene, IR olefin absorption 1,740 cm$^{-1}$, b.p. 52° C., m.p. 51° C., F-19 nmr chemical shifts at 43, 57.7, 76.9 ppm, in the relative ratio of 2:2:1, respectively.

EXAMPLE V 200 grams of sodium lauryl alcohol sulfate were added to a 1,000 ml. flask equipped with an additional funnel, distillation head, stirrer, pot and head thermometers, oil bath and dry ice trap. Benzoyl chloride electrofluorination product (200 grams), described in Example I, was slowly added to the flask with stirring. At a pot temperature of 154°–212° C., 55.6 grams of product were collected in the dry ice trap, at a head temperature of 55°–59° C. This product was found to be identical with the product described in Example IV, when analyzed by gas chromatography.

EXAMPLE VI

The method of Example V was employed in order to react 150 grams of the benzoyl chloride electrofluorination product described in Example I with 150 grams of potassium laurate. At a pot temperature of 89°–210° C., and a head temperature of 28°–40° C., there was collected 83.6 grams of product which was analyzed by gas chromatography and found to be identical with the product described in Example V.

EXAMPLE VII 1,480 grams of benzoyl chloride electrofluorination product, described in Example I, were slowly added to a 5,000 ml. flask equipped with condenser, stirrer, and thermometer and containing 1,700 ml. of 25 percent potassium hydroxide. The addition was made over a two hour period, during which the reaction was maintained at 25°–30° C. by ice bath cooling. The resulting reaction mixture was then stirred at room temperature for 18 hours. The lower phase was separated and washed three times with 400 ml. portions of water. The 850.8 grams of clear liquid was found to be identical with the product described in Example IV, when analyzed by gas chromatography.

EXAMPLE VIII 450 grams of sodium bicarbonate and three liters of water were added to a five liter three neck round bottom flask equipped with dropping funnel, magnetic stirrer, and distillation head with a 500 ml. receiver followed by a dry ice/acetone cold trap. The mixture was stirred for 15 minutes at 23° C. A perfluorocyclic acid mixture (800 grams) having a boiling point and composition identical to that of cut 3 in Example III was then added with stirring over a period of one-half hour between 23° C. and 25° C. pot temperature. The 500 ml. receiver was cooled in dry ice/acetone and the reaction mixture was heated with stirring to 95° C. After 1½ hours, 498 grams (77.7 percent yield) of perfluoroolefin product were collected in the receiver and cold trap.

Analysis of the above perfluoroolefin product on the gas chromatographic column described in Example IV showed 1.8 percent nonfunctional inert fluorochemicals, 43.1 percent decafluoromethylcyclopentenes (predominantly a mixture of the 3 and 4 isomers), 53.2 percent decafluorocyclohexene, and 1.9 percent unidentified fluoroolefins.

EXAMPLE IX 450 grams of sodium bicarbonate and three liters of water were added to a five liter three neck round bottom flask equipped with dropping funnel, magnetic stirrer, and distillation head with a 500 ml. receiver followed by a dry ice/acetone cold trap. To the above stirred mixture was added 500 grams of the electrofluorination product, described in Example I, during a period of 1 hour with cooling to maintain the pot temperature below 15° C. The mixture was allowed to stir for 17 hours at room temperature. It was then heated with a heating mantle. The product was distilled at 30°–58° C. head temperature and 59° – 88° C. pot temperature. The yield was 343.3 grams of fluorochemicals which, on analysis by gas chromatography as in Example IV, was found to contain 10.4 percent nonfunctional inert fluorochemicals, 34.2 percent decafluoromethylcyclopentenes (predominantly a mixture of the 3 and 4 isomers), 46.9 percent decafluorocyclohexene and 8.5 percent unidentified fluoroolefins.

EXAMPLE X 450 grams of potassium carbonate and 3 liters of water were added to a 5 liter flask equipped with dropping funnel, magnetic stirrer, distillation head, and condenser with a 500 ml. receiver followed by a dry ice/acetone cold trap. To the stirred solution was added 500 grams of cell product, described in Example III, over a one-half hour period between 23° and 30° C. The reaction mixture was allowed to stir for 17 hours. Heat was then applied and the product was distilled into a cooled receiver. The yield was 310 grams, at 40°–70° C. pot temperature, of a fluorochemical mixture containing 7.21 percent nonfunctional fluorocarbons, 37.84 percent decafluoromethylcyclopentenes (predominantly a mixture of the 3 and 4 isomers), 48.82 percent perfluorocyclohexene and 6.13 percent other olefins. Analysis was obtained by gas chromatography as in Example IV.

EXAMPLE XI 100 grams of anhydrous sodium acetate were added to a 500 ml. flask equipped with reflux condenser, condenser, and dry ice/acetone cold trap. To this was added, at a slow rate, 100 grams of the cell product described in Example I. The reaction mixture was allowed to cool over a period of three hours. It was then heated to 40°–90° C. and 55 grams of fluorochemical were collected. Analysis by gas chromatography as in Example IV showed the product to contain 5.5 percent nonfunctional fluorocarbons, 34.8 percent decafluoromethylcyclopentenes (predominantly a mixture of the 3 and 4 isomers), 43.4 percent perfluorocyclohexene and 16.3 percent other fluoroolefins.

EXAMPLE XII 450 grams of potassium bicarbonate and three liters of water were added to a five liter three neck round bottom flask equipped with dropping funnel, magnetic stirrer, and distillation head with a 500 ml. receiver followed by a dry ice/acetone cold trap. The mixture was stirred for 15 minutes at 23° C. A perfluorocyclic acid mixture (800 grams) having a boiling point and composition the same as that of cut 3 in Example III was then added with stirring over a period of one-half hour between 23° C. and 25° C. pot temperature. The 500 ml. receiver was then cooled in dry/ice acetone and the reaction mixture was heated with stirring to 95° C. After 1½ hours, 389 grams of perfluoroolefin product were collected in the receiver and cold trap.

By gas chromatography, the product mixture was found to contain 2.23 percent nonfunctional fluorocarbons, 43.22 percent decafluoromethylcyclopentenes (predominantly a mixture of the 3 and 4 isomers), 51.95 percent perfluorocyclohexene and 2.60 percent other fluoroolefins.

EXAMPLE XIII

To a five liter flask equipped as in Example XII was added 450 grams of KOH and 3 liters of water. The mixture was stirred and cooled to 23° C. A perfluorocyclic acid mixture (the same as that of Example XII) was then added as in Example X. The reaction was continued as in Example X. After 1½ hours, 285 grams of perfluoroolefins were obtained. Analysis of the product mixture by gas chromatography showed it to contain 11.4 percent nonfunctional fluorocarbons, 28.5 percent decafluoromethylcyclopentenes (predominantly a mixture of the 3 and 4 isomers), 56.3 percent perfluorocyclohexene and 3.8 percent other fluoroolefins.

EXAMPLE XIV 500 grams of the benzoic acid electrofluorination product described in Example II were added to a 2,000 ml. flask containing 500 grams of valeric acid. The reaction mixture was stirred and heated with an oil bath. As the reactor temperature rose from between 85° to 180° C., 450 grams of colorless distillate were collected in a dry ice trap. This product was washed three times with 300 ml. portions of water. Distillation afforded 314 grams of colorless product, b.p. 47°–53° C., which was analyzed by gas chromatography, as in Example IV. This material was found to be 18.8 percent nonfunctional inert fluorochemicals, 33.4 percent decafluoromethylcyclopentenes (predominantly a mixture of the 3 and 4 isomers), 39.6 percent decafluorocyclohexene, and 6.2 percent unidentified olefins.

EXAMPLE XV

Benzoic acid electrofluorination product (200 grams), described in Example II, was reacted with 200 grams of sodium neopentyl alcohol sulfate in the manner described in Example V. At a pot temperature of 130°–190° C., 82.2 grams of product were collected in the dry ice trap at a head temperature of 48°–49° C. Analysis of this product by the gas chromatographic method described in Example IV showed it to be 19.2 percent nonfunctional inert fluorochemicals, 33.7 percent decafluoromethylcyclopentenes (predominantly a mixture of the 3 and 4 isomers), 39.9 percent decafluorocyclohexene and 7.2 percent unidentified fluoroolefins.

EXAMPLE XVI

P-toluyl chloride was electrofluorinated in accordance with the procedures of Example I. The resulting product was hydrolyzed using the procedures of Example III. A distillation fraction of the above product (BP 92°–97° C. at 10–12 MM) was identified as an eight carbon fluoroacid mixture. This fraction (800 grams) was reacted with aqueous sodium bicarbonate in accordance with the procedures of Example XII to give 485 grams of a mixture of 7 carbon perfluorocyclic olefins. The major component was perfluoro-4-methylcyclohexene (63.4 percent) having an infrared absorption at 1,740 cm$^{-1}$. The remaining 36.6 percent was unidentified isomers, presumably perfluorodimethylcyclopentenes and other olefins.

EXAMPLE XVII

One-hundred grams of the product obtained by the electrofluorination of para(n-butyl) benzoyl chloride were added to a one-pint polypropylene wide mouth bottle equipped with a Teflon coated magnetic stirrer. Ice was placed around the walls of the bottle and the electrofluorination product was stirred at 0° C.. Water (2.8 g.) was added. The reaction was allowed to warm to room temperature and was stirred overnight. The resulting solution was purged with nitrogen for one hour and subsequently distilled. A distillation cut b.p. 97°–114b° C/1.3 mm. (70 grams) was obtained and identified as perfluoro 4-(n-butyl) cyclohexane carboxylic acid.

Sodium bicarbonate (10.5 g.) and 75 ml. of water were added to a 250 ml. three-neck round bottom flask equipped with dropping funnel, magnetic stirrer and dry ice condenser. After slow addition of 35 g. of the acid obtained above, the mixture was allowed to stir at room temperature for 16 hrs. The dry ice condenser was replaced with a distillation head, and 18 grams of olefin product b.p. 60°–85° C were obtained. The major component in the olefin mixture (octadecafluoro-4-(n-butyl)cyclohexene) comprised 59 percent of the mixture. This component was isolated by preparative scale vapor phase chromatography. The infrared spectrum showed the olefin absorption at 1,750 cm$^{-1}$. Mass spectrometry confirmed the molecular weight 462 parent peak and the Fluorine nuclear magnetic resonance spectrum was consistent with the structure.

It will be understood that the details of the above examples may be varied widely without departing from the spirit of this invention. For instance, if desired the contact between the five and six membered ring perfluorinated cyclic acid or acid fluoride and the reagent may be carried out in a flow tube reactor by passing the gaseous or liquid borne five or six membered ring perfluorinated cyclic acid or acid fluoride through the heated reagent and condensing the desired cyclic perfluoroolefin from the reactor effluent.

The novel perfluoroolefin compounds obtained in accordance with the present invention, viz., decafluoro-3-methylcyclopentene, decafluoro-4-methylcyclopentene and octadecafluoro-4-(n-butyl)cyclohexene, have characteristics which are unique even compared to the compound perfluoro-1-methylcyclopentene with respect to the oxidation of the perfluoroolefin to acid using potassium permanganate. For example, the oxidation of perfluoro-1-methylcyclopentene with potassium permanganate results in a diacid (perfluoroglutaric) with less fluorine content than the (perfluoromethylglutaric) diacids obtained by the oxidation of either decafluoro-3 -methylcyclopentene or decafluoro-4-methylcyclopentene with potassium permanganate. Similarly, the oxidation of octadecafluoro-4-(n-butyl) cyclohexene affords hexadecafluoro-3-(n-butyl) adipic acid.

From the foregoing it will be seen that this invention is well adapted to obtain all of the ends and objects hereinabove set forth, together with other advantages which are obvious and which are inherent to the system. Thus, a process is provided for preparing five and six membered ring fluoroalkyl substituted and unsubstituted perfluoroolefins having six to 10 carbon atoms in very high yields. Included among the cyclic perfluoroolefins which may be prepared by process of this invention are the novel perfluoroolefin compounds decafluoro-3-methylcyclopentene, decafluoro-4-methylcyclopentene, and octadecafluoro-4(n-butyl) cyclohexene.

Obviously, many modifications and variations of the invention as hereinbefore set forth can be made without departing from the spirit and scope thereof and therefore, only such limitations should be imposed as are indicated in the appended claims.

What is claimed is:

1. The method of preparing cyclic perfluoroolefins having six to 10 carbon atoms which comprises reacting, in an aqueous medium, a five or six membered ring perfluorinated cycloalkane monocarboxylic acid or perfluorinated cycloalkane monocarboxylic acid fluoride with a reagent selected from the group consisting of sodium or potassium hydroxides, carbonates and bicarbonates at temperatures in the range of from about 40° C to about 200° C and recovering the cyclic perfluoroolefin.

2. The method of claim 1, in which the reagent is potassium hydroxide.

3. The method of claim 1, in which the reagent is sodium bicarbonate.

4. The method of claim 1 in which the reagent is potassium carbonate.

5. The method of claim 1 in which the reagent is potassium bicarbonate.

* * * * *